Sept. 25, 1956 G. J. HORVITZ 2,764,539
CARBON ELECTRODES
Filed Aug. 21, 1952
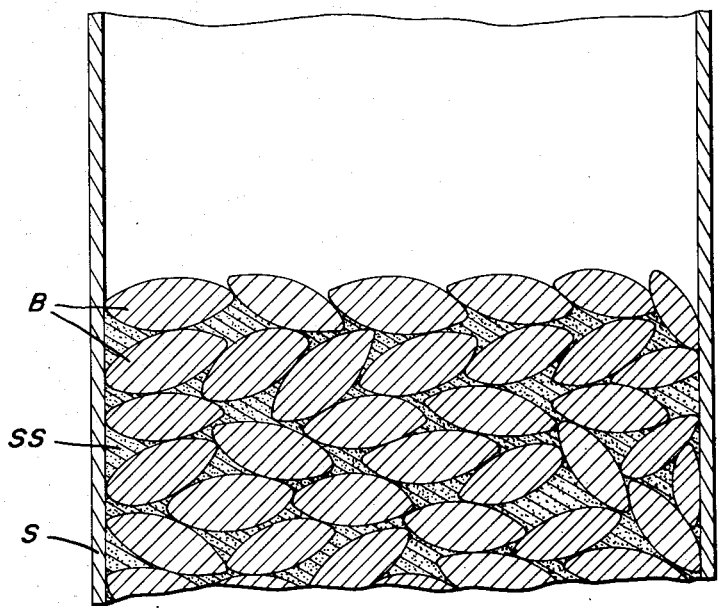
Gerald J. Horvitz
INVENTOR
BY Mock + Blum
ATTORNEYS United States Patent Office 2,764,539
Patented Sept. 25, 1956

2,764,539
CARBON ELECTRODES

Gerald J. Horvitz, New York, N. Y., assignor, by mesne assignments, to Frank H. Morse, Gerald J. Horvitz, and Benjamin Sack Application August 21, 1952, Serial No. 305,700

16 Claims. (Cl. 204—67)

My invention relates particularly to new and improved carbon electrodes; new and improved electrode-forming compositions or mixtures or masses; new and improved hard and crystalline carbon; new and improved carbon briquettes; and new and improved methods for making the same. The invention includes said compositions or mixture or masses, and said crystalline carbon, and said briquettes, irrespective of the method of manufacture. The improved carbon and the improved carbon bodies disclosed herein may be used for any purpose.

This application is a continuation-in-part of my application Serial No. 298,623, filed on July 12, 1952 (now abandoned).

Baked carbon electrodes which are used for electric furnace work and in the electrolytic production of aluminum, consist of body material and a binder. The body material consists substantially of elemental carbon. This body material is exemplified by calcined petroleum coke, other cokes, charcoal, certain types of coal and lampblack. These body materials are classified in the technical literature as having an amorphous carbon structure, although X-ray analysis and other tests show minute crystallites.

The binder is exemplified by petroleum pitch which is a residue of the refining of an asphalt-base petroleum, other pitches, and various tars. Many of these binders consist of elemental carbon and hydrocarbons. Other binders which are disclosed in the technical literature include molasses, resins, turpentine and various products which are produced by distilling organic substances. The binder may consist in whole or in part of one or more organic compounds, without any elemental carbon. These binders usually include volatile material which is largely eliminated by the baking. The residue of the baked carbon binder consists substantially of elemental carbon which bonds the particles of the body material. All these binders are generally designated as carbonaceous binders for the purposes of this disclosure.

As one illustration of the old method, petroleum coke is crushed and calcined, and the resultant carbon body material is ground and this is mixed with the warm binder, which is in the form of small particles. This mixture is cooled, crushed and ground to produce the electrode-forming composition. The ground electrode-forming composition is heated in a mold until it becomes pasty. The mold is then removed from the heating oven, and the material in the mold is subjected to high pressure in said mold. The molded shape is then removed from the mold and is baked in a furnace, with the exclusion of air, in order to remove the volatile matter. Due to the low thermal conductivity of the molded shape, the baking process requires great care, and the finished electrodes are often warped and have low conductivity, and low mechanical strength, due to improper baking. Also, a long baking period of one to two weeks is required, especially if the electrode is of large size. Also, a long cooling period of the furnace is required.

In another type of the old method, the electrode-forming composition is shaped into cylindrical plugs which are shaped by extrusion. The extruded material is cut into blanks of suitable length, which are baked as above described.

The baking distills, or decomposes or cracks the binder, drives off its more volatile ingredients as gases or vapors, and finally converts the binder into a residue of coke. The maximum temperature of the furnace is about 1050° C. in a gas-fired furnace.

These old methods have been used for at least fifty years, as evidenced by a text-book entitled "Electric Lighting" by Crocker, published in 1901 by D. Van Nostrand Company.

Instead of using these old pre-baked electrodes, it has also been well-known for many years to feed the initial paste mixture of body material and an unbaked binder into a metal shell, and to use the filled metal shell as an electrode in smelting furnaces to produce ferro-alloys, calcium carbide and other material. The initial paste is baked in said metal shell, in order to provide said metal shell with a filling of baked carbon electrode. This type of electrode is known as the Soderberg electrode or self-baking electrode. The disadvantages which result from the low thermal conductivity and low electrical conductivity of the initial electrode-forming paste are particularly objectionable in the self-baking electrode. The low electrical conductivity results in low electrical efficiency. The electrode-forming paste is not pressed before baking. In order to use the selfbaking electrode in the electrolytic production of aluminum, in an aluminum reduction furnace, it is necessary to drive electrically conductive rods into the soft paste. The self-baked electrode filling also often has a weak and non-uniform mechanical structure, so that it chips and breaks. These disadvantages have been known for many years.

The production of baked carbon electrodes, including the self-baking electrode, and the materials used therein, are described in "Industrial Carbon" by C. L. Mantell, published in 1946 by D. Van Nostrand Company, Inc.

According to one important feature of my invention, I use a body material which has not heretofore been used in making baked carbon electrodes. This body material is designated herein as crude and coarse oil carbon-black. It is made by decomposing or cracking a fraction of petroleum which is preferably an asphalt-base petroleum, or by burning such a fraction with insufficient air for complete combustion. This body material has been well-known for many years, and it has been unsuccessfully attempted to use it in making pre-baked carbon electrodes and in initial electrode-forming compositions which are used for making the self-baked type of carbon electrode.

This crude and coarse oil carbon black has an amorphous structure, and a large particle size for this type of carbon. Thus, the pure and expensive carbon black which is made from natural gas, and which is used in making printing inks, has a particle size of less than 60 millimicrons (0.000060 millimeter). The particle size of lampblack is a maximum of 100 millimicrons. This crude and coarse oil carbon black usually has a particle size of 200 millimicrons to 275 millimicrons. It also has a substantial proportion of volatile matter, which consists substantially of carbon compounds. It also has a blue-black color. As commercially made and sold, it consists of aggregates of its fine particles. These aggregates may have a size of 0.42 millimeter or more. For these reasons, this crude and coarse oil carbon black can not be used in making printing inks, and it has been used as a fuel or as a cheap filler. It may have a particle size up to one micron or more.

According to my invention, I can utilize this amorphous and coarse and crude oil carbon black as a body material, and I heat-convert it to a hard and crystalline carbon which can scratch window glass. In its broader aspect, the invention includes the use of all other carbon body materials, although it is preferred to use said coarse and crude oil carbon black as the only body material, or in a ratio of at least 25% of the body material. Thus, the crude and coarse oil carbon black may be 50% or more of the body material. All ratios and proportions stated herein are by weight, unless otherwise stated.

The invention is further explained in the following example and diagrammatic drawing, to which the invention is not limited. The annexed drawing is a diagrammatic vertical section, partly broken away, of a self-baking electrode which has a metal shell S and a filling in the shell which essentially consists of pre-calcined briquettes B. The briquettes B have intermediate spaces, which are substantially filled with a carbon filler and a binder SS. The briquettes B are substantially in contact with each other and in contact with the shell S, as shown in the drawing.

The body material in this example is said crude and coarse oil carbon black. This has a soft and amorphous carbon structure. It has a particle size of 200 millimicrons to 600 millimicrons. These fine particles are in the form of aggregates of much larger size than said fine particles.

This body material in this example consists substantially of 75% of elemental carbon, 15% of absorbed or adsorbed water, and 9% of volatile matter which consists of carbon compounds.

If the crude and coarse carbon black is made from an asphalt-base petroleum or a fraction thereof, which is highly preferred, these volatile carbon compounds are members of the aromatic or nuclear or closed-chain series or include a large proportion of the carbon compounds of the aromatic or nuclear or closed-chain series.

This coarse and crude and amorphous oil carbon black preferably has a low percentage of sulfur and ash. Preferably, it has not more than 0.75% of sulfur and not more than 0.40% of ash. For certain purposes, it is highly desirable to make an electrode which has a minimum of sulfur and ash, as for use in the electrolytic production of aluminum. Hence, all the materials which are used in the manufacture of the electrode may have a minimum of sulfur and ash, so that the finished electrode will not have more than 0.75% of sulfur and not more than 0.40% of ash, and preferably less.

This crude and coarse oil carbon black is dried at 100° C., in air under normal atmospheric pressure of 760 millimeters of mercury. This drying step removes substantially all of the water, without removing the volatile matter. If any volatile matter is removed, the amount which is removed is negligible.

The dried body material consists substantially of 90.5% of elemental carbon, 9.3% of volatile matter, and small percentages (if any) of sulfur and ash.

The dried body material is now mixed with an unbaked or unset binder. This is preferably a residual pitch of asphalt-base petroleum, as distinguished from pitches and tars which are products of distillation. This pitch which is used in the example softens at 71° C. I can use such residual pitch which has a softening point of 70° C. to 127° C. This pitch has 0.2% to 0.5% of water.

The binder pitch is melted in a tank at a suitable temperature, such as 149° C. to 204° C. This is done in air under said normal pressure. The fused pitch is a pourable liquid at 149° C. to 204° C. The water is thus substantially or wholly eliminated from the pitch.

The dry body material is added to the dry and molten pitch in the tank. The dry body material is in the form of aggregates of its fine particles. The size of such aggregates may be 0.42 millimeter. The dry body material is added slowly in successive small quantities, with vigorous rubbing and stirring to make a uniform mixture and to break up the aggregates as much as possible to fine particle size. The aggregates are rubbed against the wall of the tank or they are otherwise mechanically worked to break up the aggregates. The temperature of the molten pitch and of the mixture is maintained at 149° C. to 204° C., and the final mixture is vigorously worked and rubbed and stirred while said temperature is maintained, in order to break up the aggregates. The fine particles of the body material absorb or adsorb the molten pitch to a maximum extent. The pitch coats said fine particles. Little or none of the original volatile matter of the body material may be driven off during this mixing step.

It is highly preferred to retain said original volatile matter of the body material or at least a major proportion thereof in the mixture. However, the broader aspect of the invention is not limited to this feature. The final mixture is substantially free from water. One of the important features of the invention is to break up the aggregates of the body material into ultimate fine particle size, and to cause said very fine particles to absorb or adsorb a maximum of binder, and to coat the very fine particles with the binder, thus separating the very fine particles by the binder coatings.

Another important feature is to bake or calcine this body material after it has been formed with a binder into a briquette of high density, which is optionally and preferably of maximum density, instead of calcining this body material in loose powder form, in which it is free from binder.

Another important feature is to bake or calcine this body material after it has absorbed or adsorbed a maximum amount of the binder and while its very fine particles are separated by their individual binder coatings.

The final mixture is used for making bonded briquettes or bonded aggregates.

As one illustration, the briquette-forming mixture has substantially the following composition:

|  | Per cent |
| --- | --- |
| Elemental carbon of the coarse and crude oil black | 80 |
| Volatile matter of said body material | 8 |
| Binder | 12 |

As above noted, there may also be small percentages of sulfur and ash.

In such case, the final briquette-forming mixture is a powdery mass at 149° C. to 204° C. When this mixture is cooled to a briquetting temperature of 93° C. or to 20° C.–25° C., it remains a powdery mass, which can be briquetted without using additional binder. The binder in this briquette-forming mixture is unbaked.

As another illustration, and disregarding the small percentages of sulfur and ash which may be present, the composition of the briquette-forming mixture may be substantially as follows:

|  | Per cent |
| --- | --- |
| Elemental carbon of the coarse and crude oil black | 77 |
| Volatile matter of said body material | 7.7 |
| Binder | 15.0 |

In such case, the final briquette-forming mixture is a paste at 149° C. to 204° C., and when cooled to 93° C. and to 25° C. The separated fine particles of the elemental carbon also adsorb or absorb a maximum of the binder and are also coated by the binder. There is an excess of binder in this composition, which produces its paste structure, which is the preferred structure. This paste can be briquetted in paste form without adding additional binder, or it may be cooled and ground to form pasty particles whose size is 0.42 millimeter. These pasty particles can be briquetted without using additional binder.

The briquette-forming mixture is briquetted under suitable pressure, to produce a dense and uniform unbaked briquette or bonded aggregate. The briquetting temperature may be 93° C. At this temperature, the briquetting pressure may be 15,000 pounds per square inch, or about 1050 kilograms per square centimeter. Higher or lower pressures may be used at this briquetting temperature, or at any other selected briquetting temperature.

The briquetting temperature may be 20° C.–25° C., in which case the briquetting pressure is increased above 15,000 pounds per square inch. It is preferred in many cases to make unbaked briquettes or unbaked bonded aggregates of maximum density. For some purposes, less than maximum density is preferred.

These unbaked briquettes are now baked, in the absence of air, in a suitable furnace or oven. A gas-fired oven or furnace is preferred. The original volatile matter of the body material and the binder are thus baked. The baking evolves gases or vapors which are driven off. The baking also produces a coked or cracked or calcined residue of said original volatile material, and a coked or cracked or calcined residue of the binder. These residues consist substantially of elemental carbon. In this illustration, the weight of the residue of the baked binder is substantially 34% of the original weight of the unbaked binder, or of the binder in the unbaked briquette.

Although the briquettes are heated in a continuous baking procedure, such heating procedure may be divided in a gas-fired oven into four general stages as follows, in which the temperature is the temperature to which the briquette is heated:

*First stage.*— Two hours up to substantially 1093° C.

*Second stage.*—One additional hour at substantially 1093° C. to 1204° C.

*Third stage.*—An additional period of 35 minutes at substantially 1204° C. to 1260° C.

*Fourth stage.*—An additional period of 45 minutes at substantially 1260° C. to 1296° C.

The baking temperature to which the briquette is heated may be at least 1288° C. during the entire period of 45 minutes of this fourth stage.

During this fourth stage, the minimum baking temperature to wihch the briquette is heated may be 1344° C.

The heating of the briquettes to an elevated temperature in this fourth stage, during a sufficient period of time, is an important factor in heat-converting the original amorphous structure of the fine and separated particles of the crude and coarse oil carbon black into a hard and crystalline structure, which can scratch window glass.

A typical baking procedure which is used to bake the briquettes is as follows:

| Time in Minutes from Beginning of Heating Period | Temperature of Furnace in Centigrade Scale, Degrees |
|---|---|
| Zero | Furnace Heating Begins. |
| 10 | 316. |
| 24 | 494. |
| 34 | 594. |
| 66 | 666. |
| 80 | 760. |
| 105 | 910. |
| 120 | 966. |
| 135 | 1,027. |
| 155 | 1,088. |
| 185 | 1,100. |
| 220 | 1,216. |
| 230 | 1,260. |
| 255 | 1,294. |
| 275 | 1,296. |

At the end of this total baking or heating period of four hours and thirty-five minutes, the heat of the furnace is discontinued, and the briquettes are cooled in the furnace, with the exclusion of air, to 20° C.–25° C.

By thus baking separated small briquettes, whose baked or unbaked weight may be 28 grams or less, I provide uniform baking of said small briquettes, and I produce briquettes of uniform and strong structure. I also greatly lower the baking period and the cooling period which is required to make the finished baked electrode, because I use a large proportion of these pre-baked briquettes in making the finished baked electrode. The briquettes may be separated by sand or other packing material, while they are being baked in the gas-fired furnace.

The hardness of certain materials in the well-known Moh hardness scale is as follows:

| Material | Hardness number in the Moh scale |
|---|---|
| talc | No. 1. |
| apatite, $(CaF)Ca_4(PO_4)_3$ | No. 6. |
| quartz | No. 7. |
| diamond | No. 10. |

Graphite is even softer than talc in the Moh scale.

The hardness of the crystalline carbon structure of the baked briquettes is at least Moh No. 6, and it is preferably at least Moh No. 7. A hardness of Moh No. 7 is preferred.

A typical analysis of a baked briquette is as follows:

|   | Percent |
|---|---|
| Elemental carbon or original body material and residue of volatile matter of said body material and of the binder | 98.32 |
| Moisture | 0.09 |
| Residual volatile material | 0.75 |
| Sulfur | 0.64 |
| Ash | 0.20 |

This briquette was made with the use of a briquette-forming mixture of the previously mentioned paste type. Microscopic examination showed that its elemental carbon consisted substantially of particles which had a particle size of 200 millimicrons to 600 millimicrons.

This baked briquette had an apparent specific gravity or apparent density of 1.34, a real specific gravity or real density of 1.96, and a volume resistivity at 20° C.–25° C. of 0.00615 ohm cm.$^3$.

This volume resistivity is the electrical resistance of a cube whose edge has a length of one centimeter.

The maximum volume resistivity of the baked briquette may be 0.008 ohm cm.$^3$.

The difference between the apparent specific gravity and real specific gravity of the briquette is due to the fact that gases or vapors are evolved during the baking, which produce pores in the baked briquette.

The apparent specific gravity of the baked briquette was determined by giving it a thin water-proof coating of paraffin, and weighing the coated briquette under water, which showed that its weight was 1.34 grams per cubic centimeter. This method is described in Thorpe's "Dictionary of Applied Chemistry," vol. VI, published in 1926, at page 305.

The real specific gravity was determined by the method which is generally described in said text-book by Mantell. The baked briquette was ground to a particle size of 0.044 millimeter to 0.074 millimeter. This ground material was dried in air under said standard pressure for one hour at 105° C., and it was then weighed. The dry and ground briquette material was then put into a specific gravity bottle or pycnometer, which has an index mark which indicates a known volume, and the ground briquette material was covered with anhydrous kerosene. This bottle was shaken until the kerosene thoroughly wetted the water-free ground briquette material. The bottle was then subjected to a vacuum, in order to remove all air from the ground briquette material. The bottle was then filled with anhydrous kerosene to the index mark. The bottle and its contents were then heated to 116° C. and were then cooled to 26.7° C., at which the bottle and its contents were weighed. The real specific gravity is calculated by the following formula:

$$\frac{A \times \text{specific gravity of kerosene}}{A+B-C}$$

A is the weight of the ground and dry briquette material, which is multiplied by the specific gravity of the kerosene; B is the weight of the bottle when it is filled only with kerosene to its index mark; C is the final weight of the bottle when it contains the ground and dried and air-free briquette material and a filling of air-free kerosene up to the index mark.

In this briquette, the residue of the volatile matter of the crude and coarse oil carbon black and the residue of the binder are substantially or largely coke or elemental carbon, so that the briquette contains at least 90% of elemental carbon, and much more in this illustration.

In this illustration, the briquette has rather low apparent specific gravity. Also, it has rather low thermal conductivity, because in this example, it is intended to use the baked briquettes to make a pre-baked or self-baked electrode of low thermal conductivity. In some cases, as in an electrode which is used in producing aluminum by electrolyzing a fused bath, low heat conductivity of the electrode is desirable.

However, the apparent specific gravity of the briquette and of the electrode can be increased by using a smaller percentage of said residual petroleum pitch binder, or by using another binder which evolves only a small amount of gases or vapors during the baking. It is well known to use binders which evolve only a small amount of gases or vapors during the baking, when it is desired to make a baked electrode of high apparent specific gravity.

The real density or real specific gravity of the baked briquette is preferably at least 1.80. A preferred range of real specific gravity is 2.02 to 2.08.

Also, the specific resistivity of the baked briquette and the electrode which is made with the use of the briquettes can be lowered from said value of 0.00615 cm.$^3$ by selecting the materials and the apparent density, to 0.0055 ohm cm.$^3$ or less.

In this illustration, the weight of the baked briquette is about 83% of the weight of the unbaked briquette.

The weight of the unbaked briquette may be 28 grams or less. The preferred range of weight of the unbaked briquettes is in a range of 28 grams to 98 grams. Without limitation as to weight, said weight of the unbaked briquettes may be as high as 140 grams.

The baked briquettes have substantially the same shape as the unbaked briquettes.

All the briquettes which are used in an electrode-forming mass preferably have the same weight, shape and volume.

The shape of the baked briquettes is selected so that when the baked briquettes are assembled in a mass or column in which the briquettes abut each other, there are minimum spaces or voids between the abutting baked briquettes. The baked briquettes may have the familiar pillow-shape, in which they have opposed convex arched walls. Each briquette may have one or more planar surfaces, at which they can abut when the briquettes are assembled in abutting relation in a mass or column.

Preferably, the electrode-forming mass or mixture or composition consists of baked briquettes, carbon filler and a binder for the carbon filler material. This carbon filler is preferably ground baked briquette material, which is made by grinding a sufficient number of said baked briquettes at ordinary room temperature to a particle size of 0.74 millimeter, or less. The carbon filler material thus consists substantially of elemental carbon which has the hard and crystalline carbon structure.

The baked briquettes may comprise at least 40% by both weight and volume of the electrode-forming mass and of the finished baked electrode, preferably at least 50% by both weight and volume, and up to 80–90% by both weight and volume, in the electrode-forming mass and in the finished baked electrode.

The uniformity in structure between the baked briquettes and the carbon filler is an important feature of the invention.

As one illustration, the total filler material between the briquettes may consist of 80% of said ground baked briquette material, and 20% of said residual petroleum pitch.

Hence, as one illustration, the electrode-forming mass may consist of 40 parts of pre-baked briquettes, 48 parts of carbon filler and 12 parts of binder, said proportions being by weight.

As another illustration, the electrode-forming mass may consist of 50 parts of pre-baked briquettes, 40 parts of carbon filler, and 10 parts of binder, said proportions being by weight.

As another illustration, the electrode-forming mass may consist of at least 80 parts of pre-baked briquettes, in which case said mass will have 16 parts of carbon filler and 4 parts of binder, said proportions being by weight.

The proportion of filler material will depend upon the shapes of the briquettes and the volumes of the voids between said briquettes in the electrode-forming mass or composition or mixture. These voids are preferably of individual minimum volume and of total minimum volume.

Also, the proportion of binder in the filler material may be less than 20% of said filler material, thus further reducing the percentage of binder in the electrode-forming mass or mixture or composition.

The ground briquette material and the binder are made into a uniform filler-material mixture, preferably using the same above-mentioned procedure which is used to make the briquette-forming mixture. In this illustration, the filler material is a paste. The filler material may be a powdery mass, as above described. If the filler material is a paste, it may be ground to a particle size of 0.42 millimeter.

In one embodiment, the pre-baked briquettes are mixed with the filler material mixture, in order to make a uniform electrode-forming mass or composition or mixture which is used to make the electrode. Thus, the pre-baked briquettes and the filler material mixture may be separately heated to a temperature of 149° C. to 204° C., and the pre-baked briquettes and the filler material may be mixed in this temperature range in a tank, with optional vigorous mixing, so that the filler-material coats the pre-baked briquettes and fills the spaces between said briquettes. As an alternative, the electrode-forming mixture may be made at a lower temperature, which is at or above the softening temperature of the binder in the filler material, but below the melting point of the filler binder. Also, the mixture may be made at 20° C.–25° C.

If it is desired to make a pre-baked electrode, this electrode-forming mass or composition or mixture is forced into a metal mold under any selected pressure. It is highly preferable to form an electrode-forming mass in said mold in which the pre-baked briquettes abut each other at substantial parts of their peripheries, throughout the entire mass, in order to form a skeleton of abutting pre-baked briquettes, and to embed said pre-baked briquettes in a matrix of the pressed filler material, which fills the spaces between said briquettes. It is also highly preferable to make such an electrode-forming mass in which parts of the peripheries of those pre-baked briquettes which are adjacent the inner wall of said metal mold are exposed at the periphery of the pressed electrode-forming mass, to contact said inner wall at spaced points or areas of said inner wall, substantially along said entire inner wall. By using a ram under suitable pressure, the briquettes can be forced to thus contact with each other in the mold, or to be very close to each other, even if they do not abut each other.

Although the pre-baked briquettes are of low or moderate thermal conductivity in this example, such thermal conductivity is superior to that of the initial paste which has been made according to the old method. Hence, in this preferred assembly, the pre-baked briquettes form a continuous skeleton which transmits the external baking heat throughout the electrode-forming mass, thus producing a mechanical structure of superior uniformity and strength in the final baked electrode, with minimum voids. The baking and cooling period are greatly reduced.

The compressed electrode-forming mass or blank can be baked in the mold, with the exclusion of air, either with or without applied mechanical pressure during the baking. If applied pressure is used during the baking, any selected applied pressure can be used. Some gases or vapors are evolved from the filler binder during the baking, and they are allowed to escape.

The electrode-forming compressed mass may be formed to the desired shape by extrusion or molding under pressure, and the resultant compressed and shaped mass can be baked, with the exclusion of air, without using a mold. In such case, the pre-baked briquettes also preferably form a continuous abutting skeleton, as above described.

The electrode-forming mass is baked in a continuous procedure, which may be divided into stages as follows:

*First stage.*—2 hours at 316° C. to 1094° C.
*Second stage.*—One additional hour at 1094° C. to 1204° C.
*Third stage.*—35 minutes more at 1204° C. to 1260° C.
*Fourth stage.*—45 minutes more at 1260° C. to 1315° C., with a minimum temperature of 1288° C. during substantially the entire period of this fourth stage. This minimum temperature may be 1344° C. This baking period and the necessary cooling period will depend on the size of the electrode, but the baking period can be greatly reduced over the old method.

As an alternative, the pre-baked briquettes can be assembled in a metal mold in abutting relation, to provide an assembled column or skeleton of short length. The filler material is then pressed into the voids of this skeleton. More pre-baked briquettes are then added to the skeleton, in order to increase the length of the skeleton and more filler material is then pressed into the voids between the added briquettes, in order to fill the voids. By using this procedure, contact between the pre-baked briquettes throughout the final electrode-forming mass is insured; and the voids between the non-abutting parts of the briquettes are filled with a matrix of compressed filler material in which the briquettes are embedded, save where the briquettes contact with each other.

The above methods can be used for filling the metal shell of a self-baking electrode of the Soderberg type with the electrode-forming mass, so that the pre-baked briquettes will form a continuous pre-baked abutting skeleton in said metal shell.

While it is highly preferred to provide a skeleton of pre-baked briquettes which abut each other at parts of their peripheries, the invention also includes an electrode-forming mass in which the pre-baked briquettes do not contact with each other at one or more parts of the electrode-forming mass, or in which the pre-baked briquettes are even spaced from each other throughout said mass. In such case, the pre-baked briquettes are very close to each other at parts of their peripheries. The pre-baked briquettes and the pre-baked carbon filler have a thermal conductivity which is much greater than that of the initial paste which is now used in the old method.

The invention is of particular utility in making a self-baked electrode in the metal shell of a Soderberg electrode, because the original electrical conductivity of the initial electrode-forming mass which is filled into said shell, prior to the baking of the binder in said mass, is much superior to that of the initial paste which is now used in the old method. Also, the heat is conducted directly from the metal shell to the briquettes, which abut said metal shell, and from the pre-baked carbon electrode tip to the briquettes which abut said tip, and said heat is transmitted uniformly to the pre-baked briquettes and the matrix in which they are wholly or partially embedded within said metal shell. Even if the pre-baked briquettes are spaced from each other within said metal shell, a superior electrode-forming mass is formed.

As a much less preferred alternative, unbaked briquettes may be used in every embodiment instead of pre-baked briquettes. In such case, the briquettes are baked simultaneously with the filler material. The unbaked briquettes are also preferably in abutting relation.

*Alternative materials*

Instead of using the coarse and crude oil carbon black as the body material, which is the greatly preferred body material, I can use other carbon materials which have been and are used in making carbon electrodes, as disclosed in said text-book by Mantell, or other carbon body material. Thus, I can use pre-calcined coke, such as pre-calcined petroleum coke, which has a maximum of 0.5% of volatile matter and little or no water. Other alternative body materials are exemplified by pitch coke, tar coke, retort carbon, graphite, lampblack and carbon black of any type. The selection of these body materials depends upon their cost and the intended use of the finished baked electrode.

The coarse and crude carbon black may be calcined or baked in powder form according to the above-described procedure for baking the briquettes, for use as carbon filler material, or for use in making the briquettes. However, the previously disclosed procedure is greatly preferred. A mixture of coke or other alternative carbon material may be mixed with binder and baked or calcined in powder form as above described, in order to create or improve original crystal structure.

Also, the pre-baked or unbaked briquettes may be mixed only with a binder to form the electrode-forming mass, thus eliminating the carbon filler in said electrode-forming mass. If this is done, it is preferred to use pre-baked briquettes which have small intermediate spaces or voids.

The finished baked electrode preferably has a maximum volume resistivity of 0.008 ohm cm.$^3$, and the above-mentioned small proportions of sulfur and ash, and it preferably consists of at least 85% or 90% of elemental carbon. By using the preferred materials and procedure, the entire finished electrode may consist of fine bonded particles whose size is 200 to 275 millimicrons, or with a maximum particle size of one micron. The finished electrode may thus have said hard and crystalline carbon structure, and it may have substantially the same properties as the pre-baked briquettes. The briquettes are integrally bonded in the finished electrode with the matrix, which consists either of binder residue alone or of binder residue and carbon filler.

I can use the various binders which are disclosed in said text-book by Mantell. The invention also includes any binder which can fulfill the function of the carbonaceous binders disclosed or referred to herein, and any binder which can fulfill such function is included in the disclosure and claims, whenever a carbonaceous binder is mentioned.

However, it is highly preferred to use a petroleum pitch which is a residue of asphalt-base petroleum, in combination with the crude and coarse oil black.

Many changes and omissions and additions and substitutions can be made in the above-mentioned disclosure, without departing from the scope of the invention. The invention is further disclosed and defined in the appended claims.

It is noted that the hard and crystalline structure of the briquettes is a hard and crystalline carbon structure. The briquettes and the finished electrode, in this example, have a very small percentage (if any) of the oxides which form the ash. These oxides are oxides of silicon, iron and other metals. Even if the silicon oxide is converted to quartz during the baking, the percentage of quartz is too small to provide the hard and crystalline structure which is formed herein. Calcined petroleum coke may be abrasive, due to the formation of some silicon carbide in the calcination process, but this is entirely different from the formation of a hard and crystalline carbon structure from carbon which has an original structure which is only slightly abrasive, or which has an original hardness in the Moh scale which is less than No. 6 or No. 7.

Likewise, certain types of carbon black are abrasive, because they contain a substantial proportion of siliceous impurity.

I claim:

1. A combination electrode-forming mass which consists substantially of pre-calcined briquettes and carbon filler and uncalcined carbonaceous binder, the weight of said briquettes being in a range of substantially 23 grams to substantially 116 grams, said briquettes consisting substantially wholly of elemental carbon, the non-carbon ingredients being substantially limited to less than one per cent of sulfur and less than one per cent of ash, said briquettes substantially abutting each other in said mass, said mass having spaces of irregular shape between said briquettes, said spaces being substantially filled with said carbon filled and said binder, said briquettes having a minimum specific gravity of 1.34 and a maximum resistivity of 0.00615 ohm cm.$^3$.

2. A mass according to claim 1 in which said elemental carbon of said briquettes is crystalline and sufficiently hard to scratch window glass.

3. A mass according to claim 1 in which said briquettes have a real specific gravity of substantially 2.02 to 2.08 and a maximum resistivity of 0.0055 ohm cm.$^3$ 4. A mass according to claim 1, in which said briquettes are at least substantially 40% by weight of said mass, the elemental carbon of said briquettes is crystalline and sufficiently hard to scratch window glass, said briquettes have a real specific gravity of substantially 2.02 to 2.08 and a maximum resistivity of 0.0055 ohm cm.$^3$.

5. A mass according to claim 4, in which the material of said carbon filler is substantially identical with the material of said briquettes.

6. A mass according to claim 1, in which the material of said carbon filler is substantially identical with the material of said briquettes.

7. A method of making an electrode, which consists in making a mixed mass of pre-calcined briquettes and carbon filler and uncalcined carbonaceous binder, the weight of said briquettes being substantially 23 grams to substantially 116 grams, said briquettes consisting substantially wholly of elemental carbon, said briquettes having a minimum apparent specific gravity of 1.34 and a maximum resistivity of 0.00615 ohm cm.$^3$, enough briquettes being included in said mixed mass to substantially abut each other in said mixed mass, said mixed mass having irregular spaces between said briquettes which are substantially filled by the mixed carbon filler and uncalcined carbonaceous binder, and heating said mixed mass to calcine said binder and to form a baked electrode while maintaining said briquettes in substantially abutting relation.

8. A method according to claim 7, in which the material of said filler is substantially the same as the material of said briquettes.

9. A method according to claim 7, in which the elemental carbon of said briquettes is crystalline and sufficiently hard to scratch window glass.

10. A method according to claim 7, in which said briquettes comprise substantially 40% to 90% by weight of said mixed mass, the elemental carbon of said briquettes is sufficiently hard to scratch window glass, and the non-carbon ingredients of said briquettes are limited to less than one per cent of sulfur and less than one per cent of ash, the real specific gravity of said briquettes is substantially 2.02 to 2.08, and the maximum resistivity of said briquettes is 0.0055 ohm cm.$^3$.

11. A method according to claim 7, in which the material of said carbon filler is substantially the same as the material of said briquettes.

12. A method of making a self-baking electrode in a longitudinal metal shell, which consists in filling said shell with a mixed mass, said mixed mass filling consisting of pre-calcined briquettes and carbon filler and uncalcined carbonaceous binder, the weight of said briquettes being substantially 23 grams to 116 grams, said briquettes being substantially uniformly distributed throughout said filling and consisting substantially wholly of elemental carbon and having a minimum apparent specific gravity of 1.34 and a maximum resistivity of 0.00615 ohm cm.$^3$, enough briquettes being included in said mixed mass filling to substantially abut each other substantially uniformly throughout said mixed mass filling, including the face of said mixed mass filling which is directly adjacent the inner surface of said metal shell, and applying heat to said filling to form a self-baked electrode in said shell, the spaces between said briquettes in said mixed mass filling being irregular and being filled by said filler mixed with said binder.

13. A method according to claim 12 in which the elemental carbon of said briquettes is crystalline and hard enough to scratch window glass, said briquettes have a real specific gravity of substantially 2.02 to substantially 2.08, the maximum resistivity of said briquettes is 0.0055 ohm cm.$^3$, said briquettes comprises substantially 40% to 90% by weight of said mixed mass filling, and the non-carbon ingredients of said briquettes are substantially limited to less than one per cent of sulfur and less than one per cent of ash.

14. A method according to claim 13 in which the material of said carbon filler is substantially the same as the material of said briquettes.

15. A self-baking electrode which has a metal shell and a filling in said shell, said filling consisting substantially of pre-calcined briquettes and carbon filler and uncalcined carbonaceous binder, the weight of said briquettes being in a range of substantially 23 grams to substantially 116 grams, said briquettes consisting substantially of elemental carbon, the non-carbon ingredients of said briquettes being substantially limited to less than one per cent of sulfur and less than one per cent of ash, said briquettes substantially abutting each other in said filling and also substantially abutting the inner face of said metal shell along the periphery of said filling, said filling having spaces of irregular shape between said briquettes, said spaces being substantially filled with said carbon filler and said binder, said briquettes having a minimum specific gravity of 1.34 and a maximum resistivity of 0.00615 ohm cm.$^3$.

16. A self-baking electrode according to claim 15, in which said briquettes are at least 40% by weight of said filling, the elemental carbon of said briquettes is crystalline and sufficiently hard to scratch window glass, said briquettes have a real specific gravity of substantially 2.02 to 2.08 and have a maximum resistivity of 0.0055 ohm cm.$^3$.

References Cited in the file of this patent

UNITED STATES PATENTS

| Number | Name | Date |
|---|---|---|
| 887,123 | Price et al. | May 12, 1908 |
| 1,067,031 | Jewett | July 8, 1913 |
| 1,207,694 | Pike | Dec. 5, 1916 |
| 1,215,700 | Pike | Feb. 13, 1917 |
| 1,282,475 | Sieurin | Oct. 22, 1918 |
| 1,501,108 | Hamister | July 15, 1924 |
| 1,517,819 | Beer | Dec. 2, 1924 |
| 1,670,052 | Soderberg | May 15, 1928 |
| 2,148,133 | Reuscher et al. | Feb. 21, 1939 |

(Other references on following page)

UNITED STATES PATENTS

| | | |
|---|---|---|
| 2,282,235 | Moberly | May 5, 1942 |
| 2,304,351 | Goss et al. | Dec. 8, 1942 |
| 2,376,760 | Elsey | May 22, 1945 |
| 2,527,595 | Swallen | Oct. 31, 1950 |
| 2,600,078 | Schutte et al. | June 10, 1952 |
| 2,656,309 | Brown | Oct. 20, 1953 |

FOREIGN PATENTS

| | | |
|---|---|---|
| 550,379 | Great Britain | Jan. 5, 1943 |
| 58,956 | Germany | Oct. 10, 1891 |

OTHER REFERENCES

Mantell: "Industrial Carbon," 2nd ed., pages 79, 80, 193–201, 242. D. Van Nostrand Co., Inc., New York, N. Y.

FIAT Report No. 838, O. T. S. publication PB44659, June 15, 1946, pages 10, 11 and 12.